Figure 1:
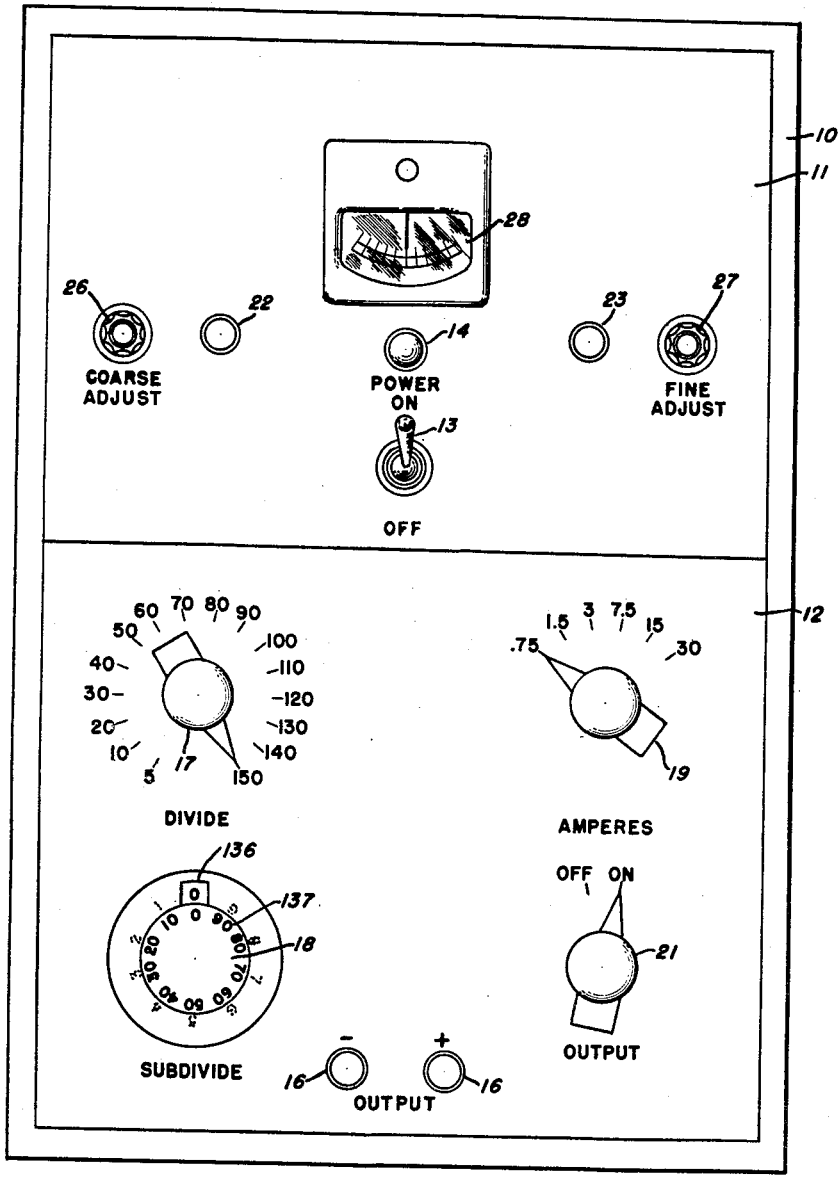

July 28, 1964 W. H. SCHWARZ 3,142,798
D.C. AMMETER CALIBRATOR UTILIZING FEEDBACK CONTROL AND
REGULATION OF CALIBRATING CURRENT
Filed Feb. 1, 1960 2 Sheets-Sheet 1

WALTER H. SCHWARZ
INVENTOR.

BY Rudolph Zunick
ATTORNEY

WALTER H. SCHWARZ
INVENTOR.

United States Patent Office 3,142,798
Patented July 28, 1964

3,142,798
D.C. AMMETER CALIBRATOR UTILIZING FEEDBACK CONTROL AND REGULATION OF CALIBRATING CURRENT
Walter H. Schwarz, Cranford, N.J., assignor, by mesne assignments, to Weston Instruments, Inc., a corporation of Texas
Filed Feb. 1, 1960, Ser. No. 5,995
3 Claims. (Cl. 324—74)

This invention relates to an instrument calibrator and more particularly to a D.-C. ammeter calibrating apparatus which includes a feedback arrangement for accurately controlling and regulating a D.-C. current to an instrument under calibration.

In the electrical field, it is necessary to check the indicating accuracy of D.-C. ammeters or to calibrate the scale thereof in the first instance. Calibrating apparatus of this class is, of course, well known and may comprise, for example, a manually controllable A.-C. voltage source feeding a rectifier network connected to a resistance voltage divider having a D.-C. instrument of high precision associated therewith. In a calibrating procedure, it is customary to mark the pointer for 5 to 15 main or cardinal standardized values of electric current passing through the instrument being calibrated, these values being appropriately selected to cover the range of the instrument scale. The scale itself is then drawn by hand or in a dividing machine, the intermediate scale divisions being interpolated by eye or mechanically. The use of such prior art apparatus, however, requires accurate adjustment of circuit elements for the production of each current output therefrom by observation of the deflection of the standard indicating instrument. Often, two operators were necessary for high precision calibration of the test instrument; one operator would make suitable circuit adjustments while observing the standard indicating instrument and, when the desired calibrating current was obtained, would orally inform the second operator who would then calibrate the test instrument at that instant. Such prior art calibrating procedure is both slow and costly, requiring many hours of labor in the calibration of only a relatively few instruments.

The apparatus of my invention includes a saturable reactor type alternating current voltage regulator, the A.-C. output from which is coupled through a variable transformer and a power transformer to a rectifier network. The direct current output from the rectifier network is fed through a precision resistor in series circuit with the ammeter under test, the voltage developed across the precision resistor being an accurate measurement of the current through the meter. Included, also, in the apparatus is a potentiometer circuit comprising a shunt connected battery and multi-tapped potentiometer. A standardization circuit, which includes a standard cell, provides means for accurately adjusting the potential developed across the potentiometer. The precision potential drop across the potentiometer, or portion thereof, is connected in opposition to the voltage developed across the precision resistor in series with the ammeter under test. The potential unbalance between the precision resistor voltage and the voltage derived from the potentiometer network is fed to a direct current amplifier, with the output of the amplifier connected to the saturable reactor type A.-C. voltage regulator for regulation of the voltage output therefrom. The resultant feedback arrangement results in the maintenance of a null between the potential derived from the potentiometer and the potential developed across the precision resistor. Further, a novel switching network is included whereby each full range scale of the calibrater (which includes a plurality of ranges) may be divided into as many as 15,000 equal parts for a resolution of one part in 15,000 at full range.

An object of this invention is the provision of apparatus for use in the calibration of D.-C. ammeters and which includes a novel circuitry whereby output currents of various predetermined values may be obtained therefrom by mere actuation of switches or calibrated dials rather than by careful adjustment of circuit elements.

An object of this invention is the provision of a D.-C. instrument calibrator for calibration of ammeters which includes a feedback arrangement for maintaining accurate current values throughout the entire range of output values of the calibrator.

An object of this invention is the provision of a D.-C. ammeter calibrator which eliminates the necessity of the operator calculating the value of each check point and then setting up several pieces of equipment to obtain the required current.

These and other objects and advantages will become apparent from the following description when taken with the accompanying drawings. It will be understood that the drawings are for purposes of illustration and are not to be construed as defining the scope or limits of the invention, reference being had for the latter purpose to the appended claims.

Figure 2:
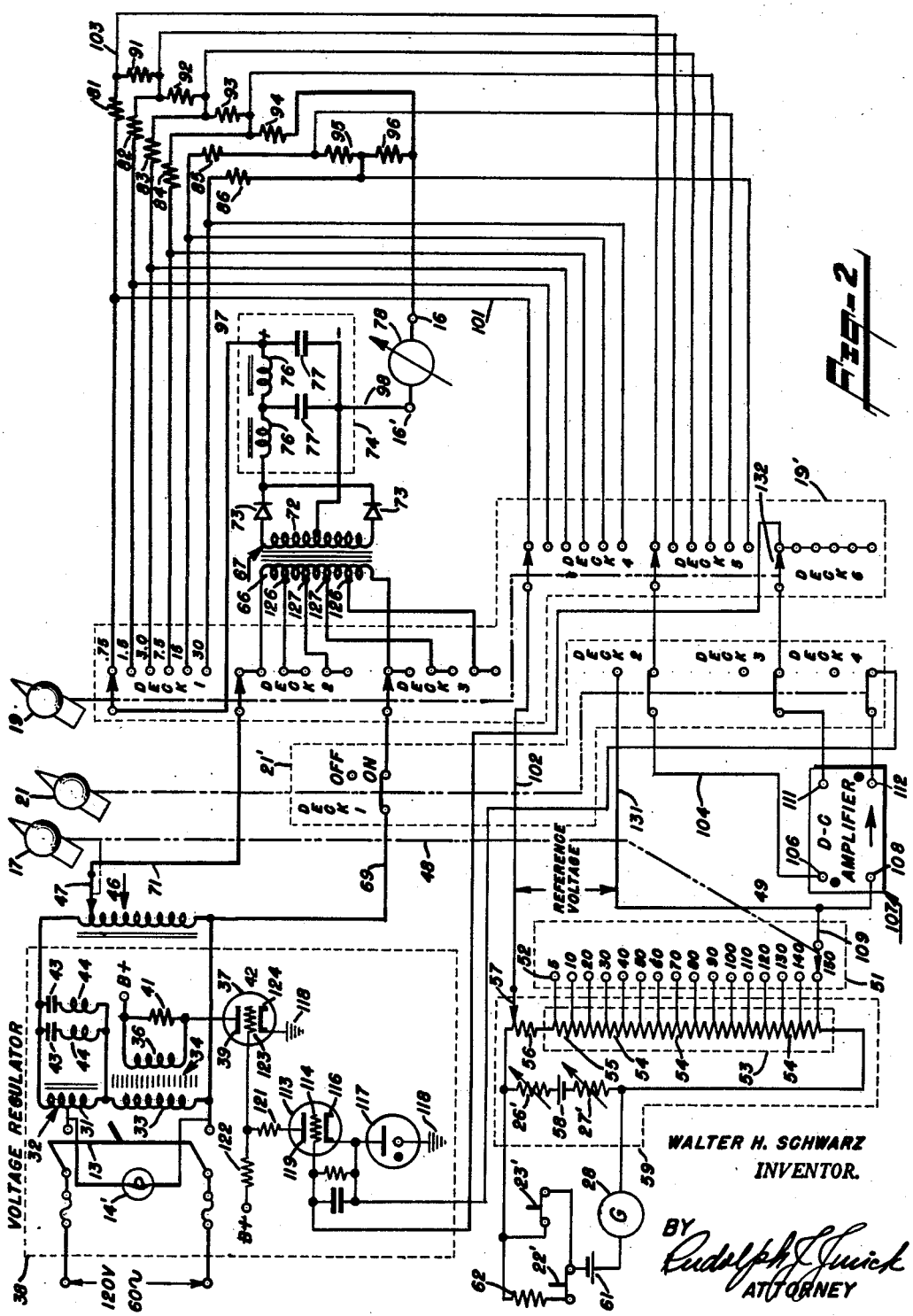

In the drawings wherein like reference characters denote like parts in the several views:

FIGURE 1 is an elevational view illustrating the front of the cabinet which houses the apparatus of my invention; and FIGURE 2 is a semi-schematic circuit diagram of the apparatus.

Reference is first made to FIGURE 1 of the drawings wherein a metal cabinet 10 is shown closed by front panels 11 and 12. Normally, the apparatus is energized by means of a connecting cable, not shown, carrying a plug for insertion into an electrical outlet connected to a conventional 120 volt, 60 cycle power line. Power is applied through fuses to a line switch 13, upon closure of which switch the power-on condition is indicated by a signal lamp disposed behind a lens 14. Housed behind the upper panel 11 is a saturable reactor type A.-C. voltage regulator for the production of a closely regulated A.-C. standard voltage of predetermined value. A variable auto-transformer and a multi-tapped power transformer connect the regulated A.-C. voltage to a rectifier network. The rectified output is filtered and connected to the output terminals, or binding posts, 16, 16' adjacent the lower edge of the panel 12, to which posts the D.-C. ammeter under calibration, or test, is connected. The magnitude of the output current from the said output terminals 16, 16' is controlled by a potentiometer, the above-mentioned variable transformer, and a plurality of selector switches controlled by the DIVIDE, SUBDIVIDE and AMPERES knobs, designated 17, 18 and 19, respectively. An output switch under control of a knob 21 functions to remove the output from the terminals 16, 16' when in the off position.

The potential developed across the constant current potentiometer employed in the apparatus may be checked, and the apparatus standardized by closing normally open push-button type switches controlled by push buttons 22 and 23, and adjustment of coarse and fine adjust potentiometer knobs 26 and 27, respectively. A galvanometer 28 is in series circuit arrangement with the standard cell employed in the standardization network of the device, the apparatus being standardized by depression of the coarse and fine adjust switches 22 and 23 and adjustment of the knobs 26 and 27 to provide a null reading on the zero center instrument 28, in a manner described in detail hereinbelow.

In operation of the apparatus, the range switch knob 19 and divide switch knob 17 are set to the full scale amperes of the instrument being calibrated, which instrument is connected to the output binding posts 16, 16', and the sub-divide knob 18 set at zero. The total number of main, or cardinal marks is generally controlled by the divide knob 17; the sub-divide knob functioning to divide adjacent DIVIDE knob positions into 1000 equal parts. It will be apparent that with a 15 step DIVIDE control 17 and with a SUBDIVIDE vernier control 18 capable of subdividing each step into as many as 1000 parts, the apparatus is capable of dividing any of the full scale ranges (as set by the range knob 19 and comprising the ranges of .75, .1.5, 3, 7.5, 15 and 30) into as many as 15,000 equal parts. Once the normal operating temperature of the apparatus is reached, and the adjust knobs 26 and 27 adjusted to provide zero output on the meter 28, highly accurate output currents of various values appropriate for the calibration of D.-C. instruments are obtained from the apparatus by setting of the knobs 17–19. No further adjustments are necessary during the calibration of instruments so long as the standard potentiometer current remains constant since the regulator is adjusted automatically and instantaneously for the correct output current by means of the novel feedback circuit employed.

Reference is now made to FIGURE 2 of the drawings wherein the line switch 13, here shown as a double pole single throw switch, is shown in an open position. Closure of the switch causes a signal lamp 14' (positioned behind the lens 14 of FIGURE 1) to be energized. The 120 volt input is connected across the input portion 31 of an auto transformer 32 through the alternating current winding 33 of a saturable reactor 34. The direct current winding 36 of the saturable reactor is included in the anode circuit of a power amplifier tube 37 in the voltage regulator, designated 38, the anode 39 of the tube 37 being connected to a positive supply source, designated B+, through the winding 36 and a shunt connected resistor 41. As is well understood, as the direct current through the winding 36 increases, with an increase in current flow through the power amplifier tube 37, the operating point on the magnetization curve of the reactor is moved toward the saturation region whereby the reactance of the A.-C. winding 33 is reduced and the alternating current through the auto-transformer primary winding 31 is increased. Conversely, as the power amplifier tube current decreases, with increased negative bias on the grid 42 thereof, the operating point of the reactor is moved to a point of increased slope on the magnetization wave whereby the reactance of the A.-C. winding 33 is increased and the current through the auto-transformer primary winding 31 decreased.

The A.-C. output from the auto-transformer is filtered by means of series connected capacitor 43 and inductor 44 combinations, and the regulated A.-C. output from the voltage regulator 38 is connected across the end terminals of a variable transformer 46. The transformer 46 is of the auto-type having a good quality low loss, magnetic core. The movable tap 47 is mechanically coupled through suitable mechanical linkage (illustrated diagrammatically in FIGURE 2 and designated 48) to the movable switch contact 49 of a multi-point switch 51 having a plurality of fixed contacts 52 connected to taps on a voltage dividing network 53 comprising a plurality of series connected resistors 54 of identical resistance value, and a resistor 55 having one-half of the resistance value of a resistor 54. The movable contact 49 of the switch 51 and the movable arm 47 of the transformer 46 are under control of the knob 17, and are simultaneously positionable thereby. The index pointer of the knob 17, as seen in FIGURE 1, is alignable with any one of the divide marks which range from 5 to 150. Since the knob 17 is movable in discrete steps, the movable arm 47 of the transformer 46 is, in operation, positionable at spaced positions along the transformer winding; the number of positions being equal to the number of fixed switch contacts on the switch 51.

A multiturn potentiometer 56 is connected in series with the resistors 54 and 55, and a constant current of predetermined value is passed through the said potentiometer and series resistors whereby a reference voltage of a magnitude dependent upon the setting of the potentiometer arm 57 and switch contact 48 is developed between the said arm and contact. It will here be noted that the resistance of the potentiometer 56 is equal to the resistance of one of the resistors 54. Further, the dial calibration of the potentiometer is such that the movable arm thereof is provided with a normal zero center position, whereby the combined resistance of the resistor 55 and one half of the potentiometer resistance equals the resistance of one resistor 54. A battery 58 is connected across the series connected voltage divider network 53 and potentiometer 56 through variable resistors 26' and 27' and provides a constant current flow therethrough. It will be noted that the variable resistors 26' and 27' are controlled by the COARSE and FINE ADJUST knobs 26 and 27, respectively, shown in FIGURE 1. The voltage divider network 53, potentiometer 56, battery 58 and variable resistors 26' and 27' comprise a constant current potentiometric network, designated 59, as a source of D.-C. voltage, which network is standardized by means of a standard cell 61 connected to the network through the galvanometer 28 and shunt connected normally open push button switches 22' and 23' under control of the buttons 22 and 23, respectively, on the front panel, as seen in FIGURE 1. A resistor 62 is included in series with the switch 22', and the potentiometric network 59 is standardized by first closing the switch 22' and adjusting the resistor 26' for a null reading on the zero center galvanometer 28. Next, the switch 23' is closed and a finer adjustment of the null position is obtained by adjustment of the resistor 27' which is of smaller resistance value than the variable resistor 26'. It will be understood that highly accurate reference voltages are obtained from the potentiometric network when the apparatus has been standardized in the above manner. During use of the apparatus, the reference voltage may be checked by depression of the switches 22 and 22', the galvanometer 28 indicating any deviation therein. The use of the reference voltage in the function of the apparatus will be understood following further description of the apparatus hereinbelow.

Returning, now, to the variable auto-transformer 46 connected across the output circuit of the voltage regulator 38, it will be seen that the output from the variable transformer is connected to the multi-tapped primary winding 66 of a power transformer 67 through switches 19' and 21' controlled by the range switch knob 19 and output on-off knob 21 on the front of the panel, as seen in FIGURE 1. The output On-Off switch 21' includes four decks each having a movable contact arm, all of which arms are simultaneously positionable by the knob 21. The multi-point range switch 19 comprises six decks each having a movable contact arm, all of which are simultaneously positionable by the knob 19. Attention is directed to the fact that the index pointer of the knob 21 is alignable with either the off or on position marks carried on the panel 12, with the switch being shown in the on position in FIGURE 2; the on and off positions also having been indicated on the upper most deck of the switch 21' as viewed in FIGURE 2. The index pointer of the knob 19 is alignable with any one of the six current output range marks carried on the front panel 12 of the apparatus; the six ranges being .75, 1.5, 3.0, 7.5, 15 and 30 amperes in the illustrated apparatus. The ranges have been indicated in FIGURE 2 on the upper most deck of the switch 19', as viewed therein; the switch being shown in the .75 ampere range position.

A lead wire 69, from the lower terminal of the variable transformer 46, is connected through Deck #1 of the switch 21' and through Deck #3 of the switch 19' to one tap on the primary winding 66 of the transformer 67.

while a leadwire 71 from the movable contact 47 of the transformer 46 is connected through Deck #2 of the switch 19′ to a second tap on the primary winding 66. Adjacent pairs of fixed contacts of the switch Decks #2 and #3 of switch 19′ are connected together and to different taps on the primary winding 66 of the step-down power transformer. With the switch 19′ on either the .75 or 1.5 ampere range, the transformer primary winding 66 is energized through the end taps; on the 3.0 and 7.5 ampere ranges the taps adjacent the end taps are employed, and on the 15 and 30 ampere ranges, the two inner-most taps are utilized. In the illustrated circuit arrangement, by way of example, only, 3.75 volts are developed at the secondary winding 72 of the transformer 67 when the switch 19′ is on either the .75 or 1.5 ampere range; 4.75 volts are developed thereat on the 3.0 and 7.5 ampere ranges; and 6.05 volts are developed thereat on the 15 and 30 ampere ranges; the above voltage values existing when the movable arm 47 on the transformer 46 is in the upper most position, as illustrated in FIGURE 2 (i.e., on the 150 mark position associated with the knob 17).

The output from the center-tapped secondary winding 72 of the transformer is rectified by diode rectifiers 73, filtered by a filter network 74 comprising series connected inductors 76 and shunt connected capacitors 77, and fed through Deck #1 of the switch 19′ to the ammeter under test, designated 78, through one of six precision resistors 81–86; there being one precision resistor for each ampere range provided. A number of voltage dropping compensating resistors 91–96 are included in the output circuit of the calibrator for reasons explained in detail hereinbelow. For present purposes, it will be understood that the resistance values of the precision resistors 81–86 are selected whereby the same potential drop is produced across each one when the corresponding full scale current is passed therethrough. In the illustrated arrangement, 150 millivolts are developed across the precision resistors 81–86 when .75, 1.5, 3.0, 7.5, 15 and 30 amperes, respectively, are passed therethrough; the resistance values of the resistors 81–86 being 0.2, 0.1, 0.05, 0.02, 0.01 and 0.005 ohms, respectively. In the illustrated position of the switch 19′, the D.-C. current path from the rectifier 74 may be traced through lead wire 97 to the movable contact arm of Deck #1 of the switch 19′, the .75 ampere range contact of the switch to the precision resistor 81, the voltage dropping resistors 91, 92, 93 and 94 to the positive terminal 16, the instrument 78 under test, the terminal 16′ and through the lead wire 98 to the negative side of the filter 74. On the 1.5 ampere range position of the switch 19′, the output current flows through the precision resistor 82, the voltage dropping resistors 92, 93 and 94, and through the instrument under test. On the 3.0 ampere range the precision resistor 83 and resistors 93 and 94 are included in the output circuits. Precision resistor 84 and resistor 94 are included in the output circuit on the 7.5 ampere range; precision resistor 85 and resistors 95 and 96 being included in the output on the 15 ampere range, and precision resistor 86 and voltage dropping resistor 96 being included therein on the 30 ampere range setting of the apparatus.

The potential developed across the precision resistors 81–86 is connected through Decks #4 and #5 of the range switch 19′ to the potentiometric network 59 through the divide switch 51. The potential drop across the precision resistor which is switched into the circuit is opposed to the reference voltage from the potentiometric network. With the switch 19′ on the illustrated .75 ampere range, one side of the potential circuit from the precision resistor 81 may be traced as follows: lead wire 101, Deck #4 of the switch 19′, and lead wire 102 to the movable arm 57 of the sub-divide potentiometer 56 in the potentiometric network 59. The other side of the precision resistor 81 is connected through lead wire 103, Deck #5 of switch 19′, and lead wire 104 to one input terminal 106 of a D.-C. amplifier 107. The other input terminal 108 of the amplifier is connected through lead wire 109 and the divide switch 51 to the potentiometric network. As described above, the magnitude of the reference voltage derived from the potentiometric network 51 and appearing between the lines 102 and 109 depends upon the setting of the divide and sub-divide knobs for the switch 51 and potentiometer 56, respectively. With the movable arm 57 of the potentiometer in the zero center position, and the movable contact of the divide switch on the 150 position terminal, a reference voltage of 150 millivolts is provided between the lines 102 and 109 which voltage opposes the potential developed across the precision resistor 81 in the output circuit of the device. Thus, with the indicated settings, if .75 ampere is flowing through the series connected precision resistor 81 and instrument under test 78, 150 millivolts are developed across the said resistor 81, and there is no unbalance voltage and, consequently, no input to the amplifier 107. If, on the other hand, the output current deviates from .75, a potential unbalance develops between the drop across the resistor 81 and the reference voltage, which unbalance is fed to the amplifier 107.

The output from the output terminals 111, 112 of the amplifier 107 is fed through Decks #3 and #4 of the output on-off switch 21′ and Deck #6 of the range switch 19′, to the input circuit of a voltage amplifier tube 113 in the voltage regulator 38; the signal being connected between the grid and cathode 114 and 116, respectively, of said tube. A cold-cathode gaseous glow tube, or voltage regulator tube 117 is connected between the cathode 116 and a common ground connection 118 to maintain a constant potential on the said cathode 116. The anode 119 of the voltage amplifier tube 113 is connected to a positive supply source, B+, through anode load resistors 121 and 122. The junction between the resistors 121 and 122 is connected to the grid 123 of the power amplifier tube 37; the cathode 124 of which is connected to the common ground connection 118. As mentioned above, the anode 39 of the power amplifier tube 37 is connected to B+ through the D.-C. winding 36 of the saturable reactor 34 in the voltage regulator 38.

The operation of the novel feedback arrangement in maintaining a constant output current may best be understood by assuming a condition wherein the output current through the meter under test 78 and series connected precision resistor 81 has increased, for example, above the .75 ampere setting whereupon a voltage of over 150 millivolts is developed across the precision resistor. The increasingly positive voltage at the lead wires 101 and 102 results in a potential unbalance between said voltage and the reference voltage from the potentiometric network 59 whereupon the input terminal 106 of the amplifier 107 is driven negative with respect to the input terminal 108. The unbalance, or error, signal is amplified, the amplifier polarity being such that a positive signal is applied from the output thereof to the grid 114 of the tube 113. The current through the tube 113 thereby increases with a resulting decrease in potential at the junction between the resistors 121 and 122 in the anode circuit thereof. The negative going signal is coupled to the grid 123 of the power amplifier 37 for a decrease in tube conduction, whereby a decreased current flows through the saturable reactor winding 36. With decreased flux in the reactor core, the operating point on the magnetization curve thereof is moved away from the saturation point, i.e., to a point of increased slope. The reactance of the winding 33 is increased thereby decreasing the current through the auto transformer 32. The voltage output from the auto transformer is likewise reduced, with a reduced voltage being applied to the variable transformer 46. In turn, the voltage to the transformer 67 is reduced whereby the rectified current output from the rectifiers 73 is also reduced, thereby reducing the output current through the precision resistor 81 and instrument under test 78 to eliminate the unbalance, or error, signal.

Since any D.-C. amplifier, including the amplifier 107, is incapable of operation over an infinite range of input potential thereto, and will saturate when the input increases above a predetermined value, it will be apparent that the unbalance, or error, signal to the amplifier input must be maintained within such predetermined values for proper amplifier operation. The apparatus of my invention includes several means of maintaining the potential developed across a precision resistor in the output current of the apparatus sufficiently near the reference voltage so as to permit operation of the amplifier 107 within its operating range, whereby the amplifier may function to correct for such potential unbalance. One such means is the provision of the multi-tapped primary winding 66 on the power transformer 67. It will be noted that as the range switch 19 is switched from the 1.5 ampere range to the 3.0 ampere range, for example, that the Decks #2 and #3 thereof connect the output from the variable transformer 46 to the intermediate taps, designated 126, of the transformer winding 66. As mentioned above, this switching operation alone, produces an increase in the voltage at the secondary winding 72 to thereby provide additional current to the rectifiers 73, 73. In like manner, the secondary voltage of the transformer 67 is raised upon switching of the range switch 19' from the 7.5 ampere range to the 15 ampere range position, for example, since the amplifier 46 output is then connected to the innermost terminals, designated 127 on the transformer 67.

The voltage dropping resistors 91–96 in the output circuit of the apparatus also provide means to keep the system functioning within the operating range of the direct current amplifier 107. As described above, for each current range of the apparatus, a different resistor, or combination of resistors, is included in the output circuit. Due to non-linearities in the resistance of various elements in the current supply and switching circuit (such as the rectifiers 73, e.g.) it will be apparent that a non-linear relation exists between the current output at the meter 78 and the voltage output from the regulator 38. That is, a plot of the current output through the meter 78 versus the voltage output from the variable transformer 46 in the regulator 38 would comprise a curve of changing slope. The compensating resistors 91–96 contribute to providing substantially identical such curves for all of the voltage ranges of the apparatus.

A third means to insure that the unbalance, or error, signal to the input of the amplifier 107 does not saturate the amplifier comprises the variable transformer 46, which functions to reduce the voltage to the power transformer 67 as the Divide knob 17 is switched from the 150 position illustrated to a lower value. It will be seen that as the knob 17 is switched to change the reference voltage output from the network 59, the arm 47 on the transformer 46 is simultaneously moved to change the output therefrom in a corresponding direction.

The output On-Off knob 21 for the control of the switch 21' serves to remove the output from the output terminals 16, 16' in the off position thereof. As seen in FIGURE 2, Deck #1 of the switch 21 removes the output from the variable transformer 46 from the primary winding 66 of the power transformer 67 in the "off" position of said switch. With no current in the output circuit, however, it will be apparent that no potential is developed across a precision resistor 81–86 whereby a large error signal to the amplifier 107 would result. To prevent such a situation, the input terminals 106 and 108 of the amplifier 107 are shorted together through Deck #2 of the switch 21' in the "off" position thereof to thereby provide a zero input to the amplifier when the switch 21' is in the "off" position; the switch being connected through the lead wire 104 and a lead wire 131 to the amplifier input. Simultaneously, Decks #3 and #4 of the switch 21' remove the amplifier output from the input of the control tube 113 of the regulator 38 to prevent large current flow within the regulator in the output off position of the switch 21'.

It will be noted that the connection from the amplifier output terminal 111 to the grid 114 of the regulator tube 113 includes the Deck #6 of the range switch 19'. As the range is changed by the switch 19', the amplifier output circuit is opened while the movable arm 132 of Deck #6 is passing between the associated fixed contacts. Excessive, and possibly damaging, voltaging regulator action is thereby prevented while switching ranges.

Before the calibration of instruments is begun, the potentiometric network 59 is checked by means of the standard cell 61 and galvanometer 28 by closing first the switch 22' and then closing the switch 23' and adjusting the respective variable resistors 26' and 27' for a null indication on the galvanometer 28, if necessary. Once the potentiometric network 59 has been so standardized, highly accurate reference voltages are obtained therefrom. Further adjustment and standardization is generally unnecessary so long as the voltage of the battery 58 remains constant. Hence, it will be understood that standardization of the potentiometer is not necessary each time an instrument 78 is to be calibrated.

From the description of the apparatus and function thereof, it was noted that the reference voltage precisely determines the output current from the apparatus since the feedback arrangement requires that any unbalance signal to the amplifier 107 be reduced to zero by automatic regulation of the output voltage from the voltage regulator. In the illustrated apparatus, the divide and subdivide knobs 17 and 18 are calibrated in terms of the reference voltage, in millivolts, fed to the amplifier 107 from the potentiometric network 59. Thus, with the subdivide knob 18 in the normal zero center position, the divide knob 17 functions by means of control of the switch 51, to provide reference voltage outputs of 150, 140, 130 . . . 20, 10 and 5 millivolts. The subdivide knob 18, which controls the setting of the potentiometer arm 57, functions to add or to subtract up to 5 millivolts from the setting of the divide knob 17. The knob, or dial, 18 for the 10 turn potentometer 56 may be of any desired type, the illustrated dial including 10 major divisions visible through an aperture 136 therein, each of which divisions is divisible by means of a vernier portion 137 into 100 parts. Thus, it will be apparent that each 10 millivolt step provided by the divide knob 17 is divisible, by means of the subdivide knob 18 into 1000 subdivisions. Since there are a total of 15 ten millivolt steps between zero and 150 millivolts, a total of 15,000 highly accurate reference voltage outputs are obtainable by means of the two knobs 17 and 18. All of the full scale ranges (30, 15, 7.5, 3, 1.5, or .75 amperes) are therefore divisible into as many as 15,000 equal parts.

The operation of the apparatus for use in the calibration of ammeters may best be understood by means of various examples. Having checked the standardization, assume for example, that the instrument 78 is to be calibrated to thirty (30) amperes full scale. The subdivide knob 18 (FIGURE 1) is set to the zero position (a mid-position of the arm 57 on the arm resistor 56, as seen in FIGURE 2) and the divide knob 17 is set at the 150 mark. The range switch knob 19 is set to 30, and, with the output switch knob 21 in the on position, 30 amperes will flow through the instrument 78. It will be understood that the 30 amperes output current through the precision resistor 86 of .005 ohm results in a 150 millivolt potential thereacross which balances against the 150 millivolt reference voltage from the potentiometric network 59. Let us assume, further, that the instrument 78 scale is to be provided with three calibrated cardinal divisions. In order to determine the settings of the divide and subdivide knobs necessary to provide the calibrated intermediated marks, it is noted that the ratio of 30:150 (or 1:5) exists between the output current in amperes and the combined setting of the divide and subdivide knobs (i.e., the reference voltage in millivolts) for the thirty ampere range. Therefore, the cardinal mark for 20 amperes is obtained by simply setting the divide knob 17 to the 100 position while leaving the subdivide knob 18 at the zero position, to maintain the 1:5 (20:100) ratio. Similarly, the 10 ampere cardinal mark is obtained by setting the divide knob 17 at the 50 position. The scale of the instrument with the thirty ampere range may be divided into as many as 15,000 equal parts. For example, between the 140 millivolt mark on the divide scale (which provides an output current of 28 amperes) and the 150 millivolt mark (30 ampere output) 1000 subdivisions are possible by use of the subdivide knob. Thus, the thirty ampere range scale may be calibrated at 2 milliampere intervals.

For the calibration of a 20 ampere full scale instrument, the ampere range knob 19 must be set at the 30 ampere range, and the divide knob 17 set to the 100 position, while the subdivide knob 18 is at the normal zero position. The 20 ampere scale is divisible into 10,000 equal parts, at 2 milliampere intervals, as above From the above, it will be apparent that any of the full scale ranges (0.75, 1.5, 3, 7.5, 15, and 30 amperes) may be divided into as many as 15,000 equal parts since the divide knob 17 is set at 150 and the subdivide knob 18 is set at zero for such full scale outputs from the calibration. For instruments having a full scale value intermediate the full scale ranges provided by the instrument, fewer subdivisions are possible. Regardless of the instrument's full scale, however, the calibrating apparatus is capable of providing current outputs at .05, 0.1, 0.2, 0.5, 1 and 2 milliampere intervals on the 0.75, 1.5, 3, 7.5, 15 and 30 ampere range settings, respectively, by use of the respective divide and subdivide knobs 17 and 18. It will be apparent, therefore, that the apparatus functions to provide not only accurate values of full scale current, and currents for the cardinal and intermediate marks, but also fractional steps, such as half steps, at the top of the scale, by simple manipulation of the divide and subdivide knobs. For example, if it is required to place 10½ steps on a 10½ ampere full scale instrument, the ampere range switch 19 would be set at the 15 ampere position. The divide knob 17 is set at 100 and the subdivide knob 18 at 5. A reference voltage of 105 millivolts is provided which is balanced by a flow of a 10½ ampere current through the 0.01 ohm precision resistor 85 in the output circuit. The 10 ampere calibration (one half step down from the 10½ ampere full scale output) is then obtained by switching the subdivide knob to zero to remove 5 millivolts from the reference voltage. The remainder of the full scale steps, i.e., 9, 8, 7, etc., are obtained by switching the divide knob 17 to the 90, 80, 70, etc., millivolts positions.

It will be apparent that the calibrator of my invention provides a rapid and simple method of operation. Simplicity of operation is combined with high accuracy, 0.05% of indicated value, to provide an extremely useful precision D.C. ammeter calibrator. The operation is semi-automatic in that the feedback arrangement incorporated therein functions to accurately maintain the output current indicated by the panel knobs. For this reason, the number of steps required to calibrate or to check the calibration of a D.-C. ammeter is considerably reduced from the number required with prior art apparatus. Further, in addition to its primary function as an instrument calibrator, the apparatus of my invention may be used as a highly regulated constant current source.

Having now described my invention in detail, in accordance with the requirements of the patent statutes, various other changes and modifications will suggest themselves to those skilled in this art, and it is intended that such changes and modifications shall fall within the spirit and scope of the invention as recited in the following claims.

I claim:

1. A self-balancing system for maintaining a constant current output from a D.-C. calibrator comprising, means developing a D.-C. potential directly proportional to the current output from the D.-C. calibrator, a source of D.-C. reference voltage opposed to the said D.-C. potential proportional to the current output, an amplifier having as an input the unbalance potential between the reference voltage and D.-C. potential proportional to the current output, an A.-C. voltage regulator having as a control signal the amplifier output, means rectifying the A.-C. voltage regulator output to provide the D.-C. calibrator output current, the regulated D.-C. output current being of a magnitude to provide a balance between the said D.-C. reference voltage and D.-C. potential proportional to the said current output, and a variable transformer having a movable arm connecting the output from the A.-C. voltage regulator to the said rectifying means, the said source of D.-C. reference voltage including a voltage divider network comprising a plurality of series connected resistors of equal resistance values, a switch having a movable contact and a plurality of fixed contacts connected to the individual junctions between adjacent resistors of the voltage divider network, the said switch providing means for obtaining a plurality of reference voltage values from the voltage divider network, and means mechanically coupling the movable arm of the variable transformer to the movable contact of the said switch for simultaneous actuation thereof, the output voltage from the variable transformer increasing as the reference voltage is increased by actuation of the switch.

2. The invention as recited in claim 1 wherein the said source of D.-C. reference voltage includes a potentiometer in series circuit with the said voltage dividing network to thereby provide means for varying the reference voltage output, the resistance of the said potentiometer being equal to the resistance of one of the equal-value resistors of the voltage divider network.

3. The invention as recited in claim 1 including a power transformer having a multitap primary winding and a secondary winding, a manually settable multipoint range switch, means connecting the output from the variable transformer through the said range switch and power transformer to the said rectifying means, the manually settable range switch conditioning the apparatus for the selected range of current to the electrical instrument.

References Cited in the file of this patent

UNITED STATES PATENTS

| 1,825,514 | Fitzgerald | Sept. 29, 1931 |
| 2,366,618 | Harrison | Jan. 2, 1945 |
| 2,722,654 | Sikorra | Nov. 1, 1955 |
| 2,724,087 | Hand | Nov. 15, 1955 |
| 2,730,668 | Edelman | Jan. 10, 1956 |
| 2,765,442 | Logan | Oct. 2, 1956 |
| 2,824,274 | Holt | Feb. 18, 1958 |
| 2,955,247 | Moyer et al. | Oct. 4, 1960 |
| 2,970,252 | Obenberger et al. | Jan. 31, 1961 |